United States Patent [19]
Yamanaka et al.

[11] Patent Number: 5,531,339
[45] Date of Patent: Jul. 2, 1996

[54] BOTTLE OF SYNTHETIC RESIN

[75] Inventors: Nobuo Yamanaka; Takashi Fujie; Hiroshi Hidaka, all of Tokyo; Yoshio Akiyama, Tochigi, all of Japan

[73] Assignee: Yoshino Kogyosho Co., Ltd., Tokyo, Japan

[21] Appl. No.: 335,883

[22] PCT Filed: Mar. 15, 1994

[86] PCT No.: PCT/JP94/00413

§ 371 Date: Nov. 15, 1994

§ 102(e) Date: Nov. 15, 1994

[87] PCT Pub. No.: WO94/21521

PCT Pub. Date: Sep. 29, 1994

[30] Foreign Application Priority Data

Mar. 22, 1993 [JP] Japan .................................... 5-061866

[51] Int. Cl.$^6$ .............................. B65D 1/02; B65D 23/02
[52] U.S. Cl. ........................ 215/12.2; 215/379; 215/381; 215/900; 220/666; 220/667
[58] Field of Search ........................... 215/16, 12.2, 381, 215/382, 379, 901, 900; 220/666, 667

[56] References Cited

U.S. PATENT DOCUMENTS

| | | | |
|---|---|---|---|
| 3,343,568 | 9/1967 | Branscum et al. | 215/379 X |
| 3,353,700 | 11/1967 | Kalina | 220/667 |
| 3,940,001 | 2/1976 | Haefner et al. | 215/12.2 |
| 4,149,645 | 4/1979 | Valyi | 215/12.2 |
| 5,089,309 | 2/1992 | Odate et al. | 215/379 X |
| 5,238,148 | 8/1993 | Holoubek et al. | 220/667 X |

FOREIGN PATENT DOCUMENTS

| | | | |
|---|---|---|---|
| 47-7845 | 4/1972 | Japan . | |
| 53-21675 | 2/1978 | Japan | 215/1 C |
| 60-75212 | 5/1985 | Japan . | |
| 3-56237 | 3/1991 | Japan . | |
| 3-111243 | 5/1991 | Japan | 215/1 C |
| 4-339759 | 11/1992 | Japan | 215/12.2 |
| 678513 | 9/1991 | Switzerland | 215/1 C |

*Primary Examiner*—Sue A. Weaver
*Attorney, Agent, or Firm*—Oliff & Berridge

[57] ABSTRACT

The present invention relates to a bottle made of synthetic resin, for containing various liquids, that can be easily fractured for easier handling during disposal or recycling. The bottle comprises a plurality of fracturing walls, each formed in a longitudinal band shape extending substantially in a direction of a central axis of the bottle, and main walls each disposed between the fracturing walls. The fracturing walls are made of a first material and a second material, the first material being a synthetic resin that is the same as a synthetic resin forming the main walls and/or has good compatibility with the synthetic resin of the main walls, the second material being a synthetic resin that has poor compatibility with the synthetic resin of the main walls. The bonding strength between the fracturing walls and the main walls is controlled so as to make the bottle easily fractured. If necessary, an inner covering member can be assembled within the bottle.

12 Claims, 4 Drawing Sheets

BOTTLE OF SYNTHETIC RESIN

BACKGROUND OF THE INVENTION

1. Technical Field

The present invention relates to a bottle made of synthetic resin, particularly, to a bottle capable of easily crushing in case of waste disposal.

2. Background Art

A bottle made of synthetic resin has many advantages, such as facility for molding, moldability into comparatively free shapes, facility for handling because of its light weight, high safety because of its difficulty in fracturing, excellent decorative function and the like. Therefore, such a bottle is used as a container for containing soft drinks, cosmetics, powders, medicines, or the like.

However, a bottle made of synthetic resin must be disposed of in a hollow state due to difficulty in fracturing. Therefore, since the bottle made of synthetic resin as a waste has a large volume as compared with its weight, it makes the cost of transportation to a waste disposal plant high and also makes the disposable mass per trip to the waste disposal plant small. Thus, it was very troublesome to handle the bottle.

For the above reasons, the following containers have been conventionally manufactured. Each of which can be crushed when disposing it to thereby reduce the volume of the waste sufficiently for easy handling.

A first container is a container made of synthetic resin having a portion for containing liquid, the portion being formed remarkably thin; The thin portion for liquid-containing is assembled into an outer container made of cardboard or the like. The first container is known as a so-called composite container.

A second container is an envelope-shaped container (pouch, standing pouch) formed by a sheet. However, the first container loses the various advantages, as a bottle made of synthetic resin, such as, for example, facility for molding and manufacturing, moldability into products rich in various shapes and appearances, facility for handling and the like. Since the first container is apt to be easily damaged by water, it is necessary to pay sufficient attention when handling it. Therefore, applicable fields for such a container are restricted drastically.

Thus, the first container has a shortcoming of losing the advantages inherent in a bottle made of synthetic resin.

Further, since the second container is molded from a sheet, the standing posture of the second container is quite unstable during use, particularly when the contents of the container became small. Additionally, as the second container is gripped for using the contents, the main body of the container is easily deformed by the gripping force so that the contents spill out of the container inadvertently, thereby soiling around it. Thus, the second container has a shortcoming of inconvenience in use.

Furthermore, it has recently become institutionalized that wastes are to be used as recycling materials for recycling. It is necessary to eliminate the remnants stuck to the inner surface of the waste bottle in order to use the waste as a recycling resource.

Accordingly, when the first and second containers are used as recycling resources, the remnants stuck to the inner surfaces of the containers should be washed, thereby increasing the cost for recycling. In addition, it is sometimes difficult to wash the remnants. In such a case, there occurs a problem that the recycling of the container should be abandoned depending on the kinds of the contents.

It is an object of the present invention to provide a bottle made of synthetic resin that, although constituted in substantially the same shape as a conventional bottle integrally formed by synthetic resin, permits its volume as a waste to be sufficiently reduced because the bottle is easily fractured. This bottle has the advantages inherent to a bottle made of synthetic resin, which is convenient to use, and also is useful as a recycling resouces.

SUMMARY OF THE INVENTION

A bottle made of synthetic resin according to the present invention comprises a bottom portion and a cylindrical body portion extending upwards circumferentially from the bottom portion about a central axis. The cylindrical body portion has a plurality of fracturing walls each formed in a longitudinal band shape extending upwards from the bottom portion substantially in a direction of a central axis of the cylindrical body portion and a plurality of main walls each disposed between the fracturing walls. The fracturing walls are made of a first material and a second material, the first material comprising the same synthetic resin as that forming the main walls and/or a synthetic resin having a good compatibility with the synthetic resin of the main walls. The second material comprising a synthetic resin having poor compatibility with the synthetic resin of the main walls.

In the bottle of the present Invention, each main wall and each fracturing wall are disposed alternately along the circumferential direction of the bottle. Adjacent main walls are each structured so as to be integrally connected by the fracturing wall disposed therebetween.

The present invention can perform in various embodiments as follows.

In general, the bottle has a cylindrical opening at the upper part of the cylindrical body portion and the main walls. The fracturing walls are provided to extend over the entire bottle, from the cylindrical opening to the bottom portion through the cylindrical body portion, so that the entire bottle can be crushed at a part of the fracturing walls.

An inner covering member may be assembled into a bottle main body, the inner covering member being thinly formed with a material having sufficient flexibility and being provided in the bottle main body so as to substantially cover the whole inner surface of the bottle main body. Usable materials for the inner covering member include synthetic resins having poor compatibility with both the synthetic resin forming the main walls and the material forming the fracturing walls.

The bottle main body and the inner covering member may be bonded by at least one bonding layer formed in a longitudinal band shape.

The material of the main walls may be ex-emplified olefin resins, such as high density polyethylene, polypropylene and the like, which can be used singly or in combination therewith.

Furthermore, a mixture of at least two kinds of resins, which are different from one another, may be employed as the material of the main wall if the resins are synthetic resins having compatibility with one another. In addition, plural kinds of resins may be multi-layered to form the main walls.

The fracturing walls are made of at least two kinds of materials, a first material and a second materials. The first material is (a) the same resin as the synthetic resin forming the main walls, (b) a synthetic resin that has good compatibility with the synthetic resin forming the main walls, or (c) a mixture of (a) and (b).

The second material is a resin that has poor compatibility with the resin of the main walls. When as the first material, a synthetic resin having good compatibility with the synthetic resin forming the main walls is used, the first material may be a mixture of plural kinds of resins having good compatibility with the synthetic resin forming the main walls. Also, as the second material, a mixture of plural kinds of resins having poor compatibility with the synthetic resin forming the main walls may be used.

Specific examples of a synthetic resin forming the fracturing walls having poor compatibility with the synthetic resin forming the main walls, when olefin resin such as high density polyethylene or polypropylene is employed for forming the main walls, include styrene resins, such as polystyrene, which has poor compatibility with the above resin. That is, the material of the fracturing walls is decided depending on what kind of synthetic resin forming the main walls is used.

The fracturing walls are each disposed between the two adjacent main walls and bond the two main walls. The bonding strength is dependent on a mixing ratio of the first material and the second material. As the mixing ratio of the second material having poor compatibility with the synthetic resin forming the main wall is higher, the bonding strength of the frac-turing walls to the main walls is lower so that the bottle is easily fractured. Therefore, the mixing ratio of the first material to the second material is decided considering the above fracturability. To be more specific, suitable first and second materials are selected, respectively. Then the mixing ratio of both materials is decided based on the physical properties thereof and the use (environmental condition) of a container to be made as a product (e.g., a bottle for use in heat sterilization, a container for use in a refrigerator) or the like, so as to mold into a bottle having an optimal bonding strength between the main walls and the fracturing walls.

The material of the inner covering member is a synthetic resin that has poor compatibility with both the synthetic resin forming the main walls and the material forming the fracturing walls. Therefore, as the synthetic resin forming the main walls and the material forming the fracturing walls are decided, the material of the inner covering member is separately decided. When the main walls are made of olefin resin and the fracturing walls are made of styrene resin, the material of the inner covering member may be nylon, ethylene-vinyl copolymer or the like.

In the present invention, since the fracturing walls are made of a mixture of material having good compatibility and material having poor compatibility with the material of the main walls, the main walls and the fracturing walls are bonded to each other with a suitable strength. Therefore, the bottle of the present invention can be molded, used and handled as in a typical synthetic resin bottle.

Since the bonding strength between the main walls and the fracturing walls is suitably controlled and set so that the bottle of present invention can be crushed, the bottle is capable of being crushed by a stress larger than a predetermined stress even when the bottle contains the contents. Thus, when the bottle of present invention is used under environmental conditions in which it is possible to excessively press the bottle, the inner covering member is preferably assembled into the bottle main body.

In this case, even if the bottle main body is pressed excessively and a part of the bonded portions between the main walls and the fracturing walls is broken, the inner covering member does not tear. Therefore, there is no fear that the contents spill spill out.

Because the inner covering member is made of synthetic resin having poor compatibility with both the synthetic resin forming the main walls and the material forming the fracturing walls, the inner covering member can be separated from the main walls or the fracturing walls as the bottle main body is fractured. Accordingly, the inner covering member is not influenced by a tensile force caused by a displacement due to the destruction of the bottle so that the inner covering member is not fractured together with the bottle main body.

According to the present invention, when the bottle made of synthetic resin is disposed of, an excessive crosswise force is applied to the cylindrical part of the bottle main body for example, by laying the bottle on its side and trampling or stepping on the bottle main body. Thus, a stress is concentrated on the bonding portions between the main walls and the fracturing walls. As a result, the bottle is fractured along the bonding portions in a folded and bended form until finally the bottle, as a whole is in a crushed state. The bottle made of synthetic resin in the crushed state is small in volume so that the bottle can be easily handled as waste.

Further, if necessary, the main walls and the fracturing walls can be separated, such as by tearing off the bonding portions by hands so that the bottle can be disposed of in pieces.

When the bottle is used as recycling resources, generally, the contents stuck to the inner surface of the bottle main body should be washed. In the conventional bottle, the contents should be washed before fracturing the bottle. In washing the conventional bottle, wash water is poured into the bottle and the wash water is then discharged. However, according to the present invention, the bottle can be washed after fracturing the bottle. On the other hand, in washing the bottle of the present invention, the bottle main body fractured may be just soaked in wash water, thereby simplifying and easing the washing process.

When the contents remaining in the bottle can be neither washed nor disposed of, the bottle is preferably provided with an inner covering member assembled into the bottle main body. When the bottle provided with the inner covering member is disposed of as waste, the bottle main body only is fractured, without the fracture of the inner covering member. The contents of the bottle remain stuck only to the inner covering, but not stuck to the main walls and the fracturing walls of the bottle main body. Therefore, the bottle main body can be used as a recycling material. Because wash water and a washing machine are not necessary, recycling of the bottle can be effected very economically.

DETAILED DESCRIPTION OF THE PREFERRED EMBODIMENTS

Hereinafter, a first embodiment of the present invention will be described with reference to the attached drawings.

Figure 1:
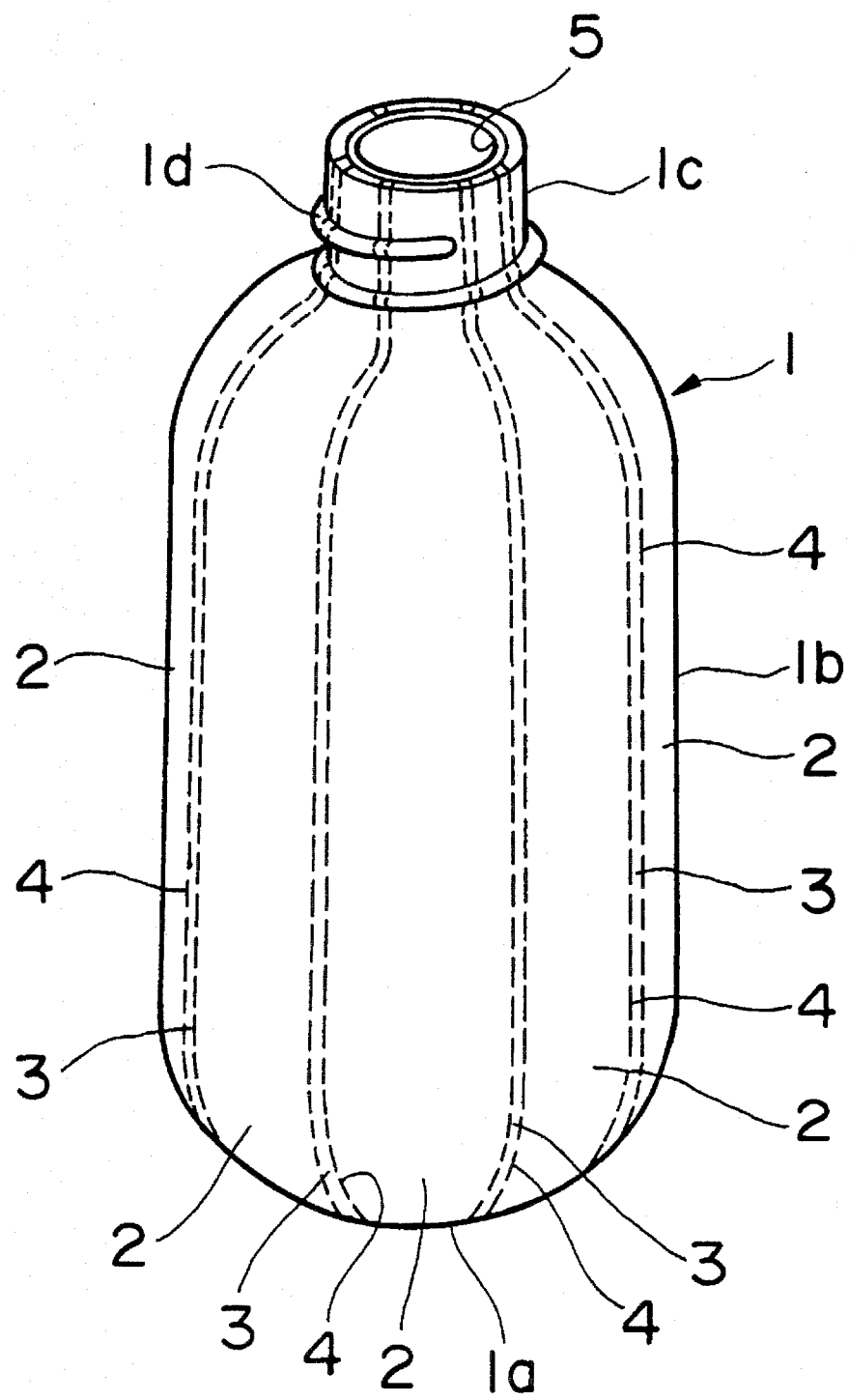
FIG. 1 illustrates a perspective view showing the whole outside of a bottle made of synthetic resin according to a first embodiment of the present invention.
Figure 2:
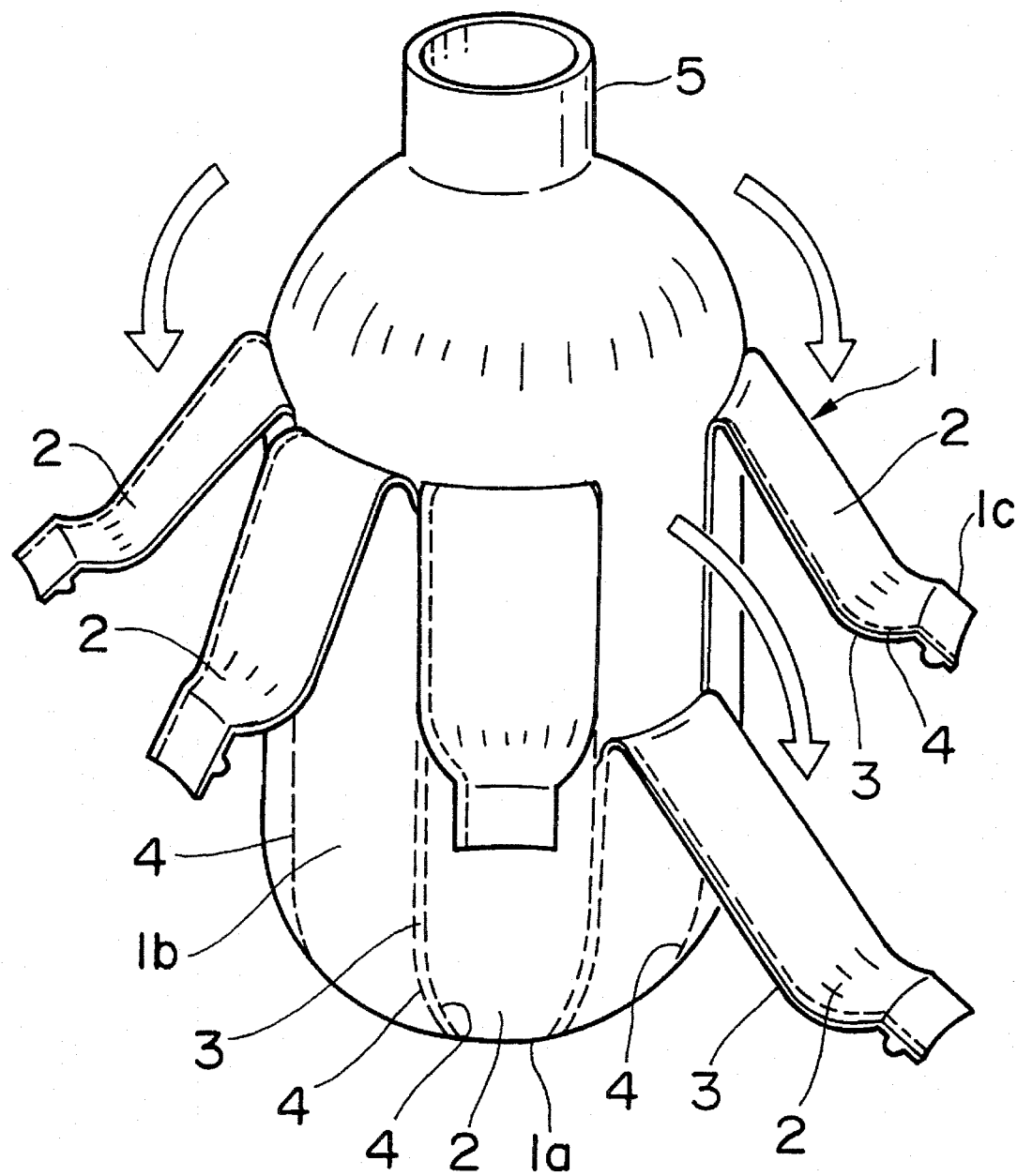
FIG. 2 illustrates a whole perspective view showing the bottle made of synthetic resin as shown in FIG. 1 in an intermediate-fractured state.

A bottle made of synthetic resin according to the first embodiment has a bottle main body 1 formed in a bottomed cylindrical shape comprising a bottom portion 1a and a cylindrical body portion 1b circumferencially extending upward from the bottom portion 1a, as shown in FIG. 1.

A cylindrical opening portion 1c is located at a upper part of the bottle main body 1 and is continuously connected thereto, while a screw thread 1d is formed on an outer surface of the cylindrical opening portion 1c.

Figure 4:
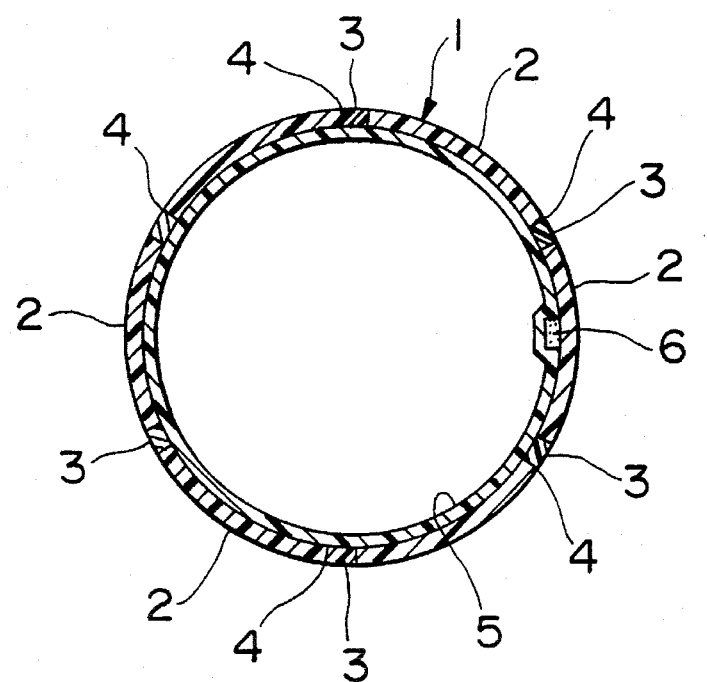
FIG. 4 illustrates a cross-sectional view of a body portion of the bottle according to the first embodiment of the present invention.

The bottle main body 1 is provided with a plurality of longitudinal band-shaped fracturing walls 3 extending over the entire height of the bottle main body 1 from the bottom portion 1a through the cylindrical body portion 1b to the cylindrical opening portion 1c along the direction of a central axis of the cylindrical body portion 1b or of the bottle main body 1. Main walls 2 are disposed between the fracturing walls 3. Thus, each main wall 2 and each fracturing wall 3 are disposed alternately. Since the fracturing walls 3 is molded from a resin different from that of the main walls 2, welded boundaries 4 are formed at the bonding portions between the fracturing walls 3 and the main walls 2. The bottle main body 1 is assembled with a thin inner covering member 5 formed so as to substantially completely cover the whole inner surface of the bottle main body 1. The inner covering member 5 is adhesively fixed to the main body 1 by an adhesive layer 6 formed in a longitudinal band shape extending over the entire height, as shown in FIG. 4. The adhesive layer 6 fixes the inner covering member 5 to the bottle main body 1 securely.

The bottle main body 1 and the inner covering member 5 are preferably in combination molded in accordance with one blow molding by a co-extrusion. The bottle main body 1 and the inner covering member 5 may also be molded separately so that the inner covering member 5 is assembled into the bottle main body 1.

Blow molding includes injection blow molding and extrusion blow molding. Injection blow molding is a method in which a bottomed cylindrical preform is previously molded by an injection molding, the preform is heated and set in a mold, and air is blown into the preform so that a bottle is molded. The extrusion blow molding is a method in which a continuous tubular parison is extruded from an extruder, the extruded parison is pinched by bottle molds and air is blown into the parison so that a bottle is molded.

The bottle main body 1 of the present invention can be molded by applying the two molding methods. More specifically, in case of injection molding the preform or in case of extrusion molding the parison, a preform or parison is cylindrically injection molded or extrusion molded using a die injecting or extruding a plurality of different resins at the same time, such as a so-called multi-manifold die. This achieves welding resins for the main walls and resins for the fracturing walls that are disposed alternately circumferentially around the bottle. Upon air blowing the thus obtained preform or parison, the bottle of the present invention can be molded.

In case the inner covering member is provided by blow molding, the resin for the inner covering member is injection molded or extrusion molded at the same time the preform or parison is molded, and is then subjected to air blowing.

An envelope-shaped inner covering member having flexibility, which is molded separately, may also be assembled into the bottle main body already molded into a predetermined shape.

Descriptions will now be made regarding materials of the main walls 2, the fracturing walls 3, and the inner covering member 5.

The main walls 2 are molded from olefin resin such as high density polyethylene, polypropylene, or the like. Olefin resin is generally used as a molding material for use in a liquid-containing bottle. A plurality of resins may be layered on the olefin resin, if necessary. The fracturing walls 3 are molded from at least two kinds of materials, a first material and a second material. The first material can be the same resin as that of the main walls 2 or a resin having good compatiblity with the resin of the main walls 2. There may be used olefin resin such as high density polyethylene, polypropylene, or the like. The second material is a resin having poor compatibility with the resin of the main walls 2. Styrene resin such as polystyrene or the like may be used. The polystyrene has poor compatibility with the high density polyethylene or polypropylene forming the main walls 2.

When high density polyethylene is employed for the main walls 2, the fracturing walls 3 are molded by a mixture of high density polyethylene and polystyrene. When polypropylene is employed for the main walls 2, the fracturing walls 3 are molded using a mixture of polypropylene and polystyrene.

When the main walls 2 are molded from polyolefin resin, the inner covering member 5 is preferably molded from nylon. Nylon has a bad compatibility with polyolefin resin. In particular, since the inner covering member 5 is thin, the inner covering member 5 is preferably made of a resin material having a high durability against tensile-fracturing force. This is another reason why nylon is preferably used.

The compatibility of synthetic resin is generally represented by a solubility parameter. The solubility parameter shows, for example, the following values. If the difference between the values of two resins is small, it is said that they have good compatibility with one another.

| | |
|---|---|
| polyethylene | 7.9 |
| polypropylene | 8.1 |
| polystyrene | 8.6–9.7 |
| polyethylene terephthalate | 10.7 |
| polyamide | 12.7–13.6 |

Furthermore, the bonding strength between the main walls 2 and the fracturing walls 3, that is, the anti-fracture strength at the welded boundaries 4 is decided by a mixing ratio of the first material to the second material of the fracturing walls 3. According to results of experiments, in cases where the bottle is used as a container containing shampoo or the like, if the first material is high density polyethylene or polypropylene and the second material is polystyrene, a suitable mixing ratio of the first material to the second material is 10:3–10:0.5 by weight. This ratio is also suitable for a mixing ratio of the other olefin resin to the other styrene resin.

When the mixing ratio of the second material to the first material of the fracturing walls 3 is high, fracture strength at the welded boundaries 4 is low so that the welded boundary 4 is easier to be fractured than is required. On the contrary, when the mixing ratio of the second material to the first material of the fracturing walls 3 is low, the bottle is difficult to fracture when disposing of the bottle. Therefore, in view of the above characteristics, the mixing ratio of the second material to the first material of the fracturing walls 3 is decided based on desired fracture strength.

Since the inner covering member 5 is made of the material having poor compatibility with the material of the bottle main body 1, the inner covering member 5 can be freely bent and deformed in the bottle main body 1. Therefore, when the bottle is used in the form of a pump type, in which the contents are pumped out, air is freely permeated between the bottle main body 1 and the inner covering member 5. As the contents are consumed, the inner covering member is shriveled so that the contents can be contained and held without completely contacting with air.

In other words, a bottle provided with such an inner covering member can be used by providing a pump on the cylindrical opening portion and is preferably used as a container with a pump.

Such an inner covering member 5 is adhesively fixed to the bottle main body 1 by the adhesive layer 6 extending over the entire height during filling of the contents, shipping and displaying of the product, purchase by consumers, and use thereafter. When the contents are pumped out by the pump, the inner covering member 5 is shriveled and deformed while maintaining a standing posture in the bottle main body 1. Thus, there is no fear that the suction nozzle of the pump will become clogged due to the shrivel and deformation of the inner covering member 5, and prevent the pumping action for the contents.

it is preferred that the adhesive layer 6 is adhered so as to be capable of peeling off for a recycling resources.

Figure 3A:
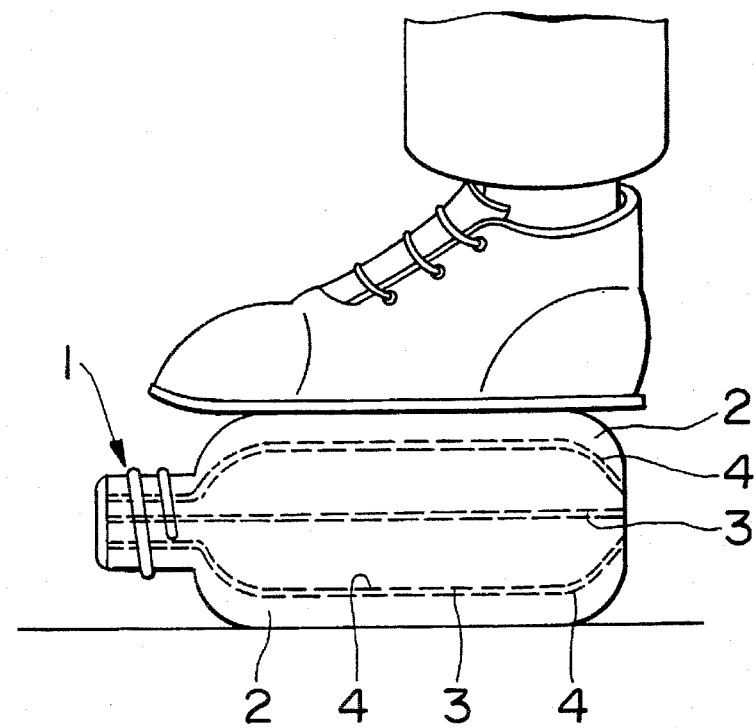
FIGS. 3a and FIG. 3b illustrate views to help explain a method for fracturing the bottle made of synthetic resin according to the present invention.
Figure 3B:
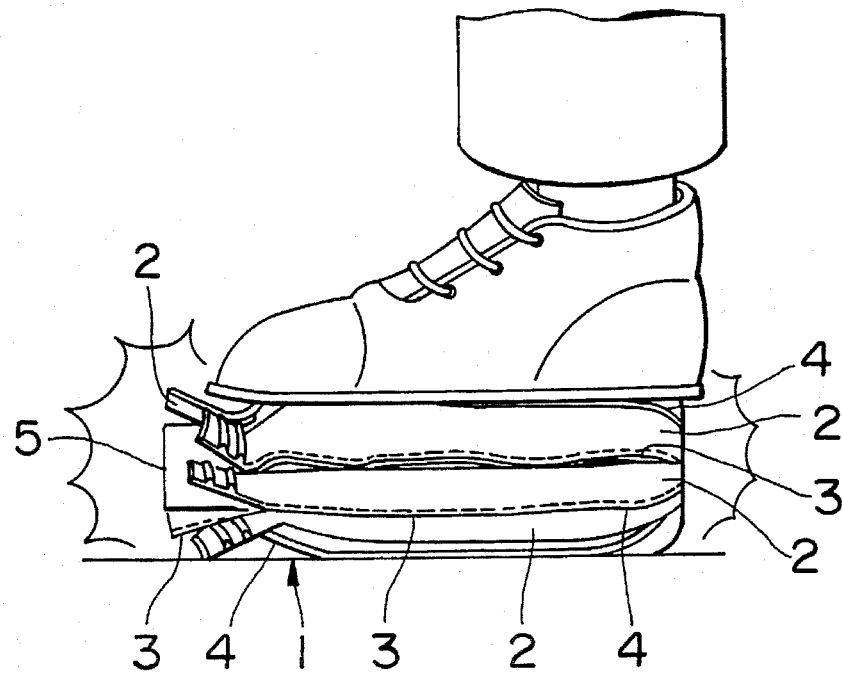

As shown in, for example, FIGS. 3(a) and 3(b), the bottle made of synthetic resin according to the present invention can be easily fractured by trampling thereon as the bottle is laid on its side upon a floor. At this time, the bottle main body 1 can be fractured to separate the main walls 2 and the fracturing walls 3 along the welded boundaries 4. Thus, the volume of the bottle can be reduced so as to be easily recovered as a recycling resource.

Hereinafter, a second embodiment of the present invention will be described with reference to FIG. 5

Figure 5:
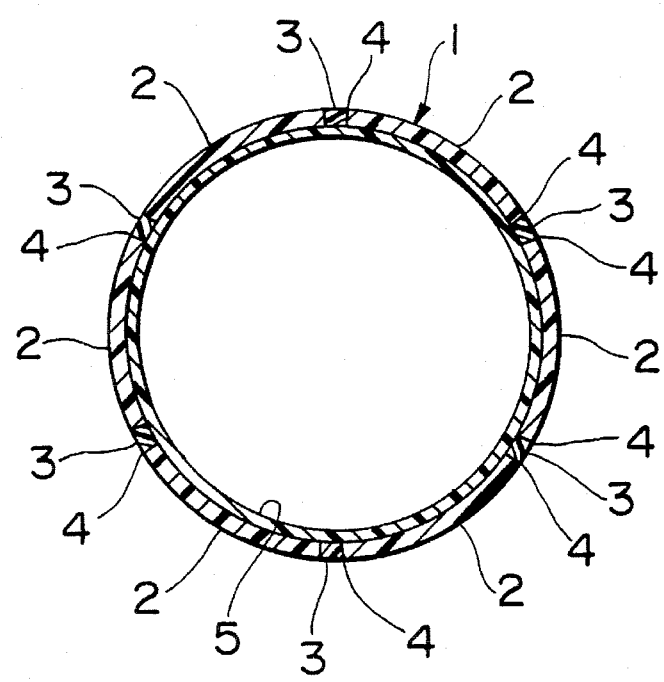
FIG. 5 illustrates a cross-sectional view of a body portion of a bottle according to a second embodiment of the present invention.

A bottle made of synthetic resin of the second embodiment is not provided with the adhesive layer 6 and the inner covering member 5 is just inserted into the bottle main body 1 as shown in FIG. 5. When the bottle of synthetic resin is small, the inner covering member 5 may be just inserted as such.

Since the other parts of the second embodiment are the same as those of the first embodiment, description with regard to the other parts is omitted.

As described above, the bottle main body of a bottle made of synthetic resin according to the present invention is easily fractured or destroyed for disposal by provision of the main walls and the fracturing walls. Thus, since the whole bottle can be in a crushed flat state or in a divided state comprising a plurality of pieces and, since the volume of the bottle as a recyclable resource can be sufficiently small, easy transportation and easy handling during disposal are performed.

Further, the bottle main-body is fractured at the boundaries between the fracturing walls and main walls and the boundaries extend along the central axis of the bottle. Thus, the fractured shape of the bottle is always uniform and the size of the fractured pieces themselves is also uniform, whereby easy handling of the bottle during disposal or recycling can be performed.

When the bottle is used as recycling resource, the bottle is washed after crushed so as to simplify the washing process of the bottle, thereby reducing the cost for recycling.

Further, even when the contents remaining within the bottle can not be washed, if the inner covering member is provided, the bottle main body can be fractured while leaving only the inner covering member, as mentioned above, wereupon recycling can be performed. When such a bottle is provided with the inner covering member, even if there occured a crack in the bottle main body during use, the contents are not be spilled out so that the bottle can be used safely.

In recycling the bottle having the inner covering member, it is not necessary to wash since the contents do not contact the bottle main body completely. If washing is necessary, it is not necessary to use a considerable amount of water or a washing machine with vast equipment when washing the fractured bottle main body itself. Thus, it is possible to reduce the cost of recycling. In addition, the inner covering member that contacts the contents has a sufficient flexibility and is formed thin with a small amount of resin so that the cost when the inner covering member is disposed of as a waste can also be inexpensive.

Furthermore, the design, such as shape, of the bottle of the present invention can be effected, like in a typical bottle, so as not to prevent the degree of freedom in the design. Since the bottle of the present invention can be handled as well as the typical bottle made of synthetic resin in use, the bottle of the invention can be used in various fields, for example, soft drinks, seasoning, shampoo, rinse, cosmetic, medicine, or the like. In particular, the bottle made of synthetic resin according to the present invention can be easily disposed of and is very useful for recycling.

We claim:

1. A bottle made of synthetic resin comprising:

a bottom portion and a cylindrical body portion extending circumferentially upwards therefrom about a central axis, said cylindrical body portion having a plurality of fracturing walls each formed in longitudinal band shape and extending substantially in a direction of the central axis of said cylindrical body portion and a plurality of main walls, each of said main walls being disposed between and frangibly connected to adjacent fracturing walls at boundaries therebetween, said main walls being formed of a synthetic resin and said fracturing walls being made of a first material and a second material, said first material being a synthetic resin having good comparability with the synthetic resin of said main walls, said second material being a synthetic resin having poor comparability with the synthetic resin forming said main walls.

2. A bottle made of synthetic resin as claimed in claim 1, comprising a cylindrical opening at an upper part of said cylindrical body portion, said main walls and said fracturing walls extending over the entire bottle from said cylindrical opening, through said cylindrical body portion, to said bottom portion.

3. A bottle made of synthetic resin as claimed in claim 1, wherein said main walls are made of olefin resin, and said first material of said fracturing walls is an olefin resin and said second material of said fracturing walls includes a styrene resin.

4. A bottle made of synthetic resin as claimed in claim 3, wherein a mixing ratio of said olefin resin and said styrene resin, which together form said fracturing walls, is 10:3–10:0.5 by weight.

5. A bottle made of synthetic resin as claimed in claim 3, wherein said main walls are made of high density polyethylene and said first material of said fracturing walls is a high density polyethylene and said second material of said fracturing walls includes a polystyrene.

6. A bottle made of synthetic resin as claimed in claim 5, wherein a mixing ratio of said high density polyethylene and said polystyrene, which together form said fracturing walls, is 10:3–10:0.5 by weight.

7. A bottle made of synthetic resin as claimed in claim 3, wherein said main walls are made of polypropylene and said first material of said fracturing walls is a polypropylene and said second material of said fracturing walls includes a polystyrene.

8. A bottle of synthetic resin as claimed in claim 7, wherein a mixing ratio of said polypropylene and said polystyrene, which together form said fracturing walls, is 10:3–10:0.5 by weight.

9. A bottle made of synthetic resin as claim in claim 1, comprising an inner covering member assembled into a bottle main body comprising said bottom portion and said cylindrical body portion, said inner covering member being thinly formed from a material having sufficient flexibility and being provided within said bottle main body to substantially cover an inner surface of said bottle main body, said inner covering member comprising synthetic resin having poor compatability with the synthetic resin forming said main walls and with the first material and second material forming said fracturing walls.

10. A bottle made of synthetic resin as claimed in claim 9, wherein said inner covering member is bonded to said bottle main body by at least one bonding layer formed in a longitudinal band shape disposed on said bottle main body.

11. A bottle of synthetic resin as claimed in claim 3, comprising an inner covering member made of nylon assembled into a bottle main body comprising said bottom portion and said cylindrical body portion, said inner covering being thinly formed from a material having sufficient flexibility and sized to substantially cover an inner surface of said bottle main body.

12. A bottle made of synthetic resin as claimed in claim 1, wherein said first material of said fracturing walls is the same as the synthetic resin forming said main walls.

* * * * *